United States Patent [19]

Murakami et al.

[11] Patent Number: 5,426,632
[45] Date of Patent: Jun. 20, 1995

[54] INFORMATION RECORDING MEDIUM AND METHOD FOR RECORDING INFORMATION TO THE SAME

[75] Inventors: Shigenori Murakami; Toshihiko Takishita; Kenji Suzuki; Kiyohide Ogasawara; Hiroshi Ito, all of Yamanashi, Japan

[73] Assignees: Pioneer Video Corporation, Yamanashi; Pioneer Electronic Corporation, Tokyo, both of Japan

[21] Appl. No.: 288,910

[22] Filed: Aug. 11, 1994

[30] Foreign Application Priority Data

Aug. 23, 1993 [JP] Japan .................. 5-207937
Jun. 24, 1994 [JP] Japan .................. 6-143456

[51] Int. Cl.⁶ .................................. G11B 3/70
[52] U.S. Cl. .................. 369/275.4; 369/288; 428/694 SC; 428/694 MM
[58] Field of Search ............ 369/275.4, 275.3, 275.1, 369/13, 32, 275.5, 283, 288, 286, 284; 360/114, 59; 428/694 SC, 694 LE, 694 GT, 694 DE, 694 RL, 694 AH, 694 MM

[56] References Cited

U.S. PATENT DOCUMENTS 5,075,146 12/1991 Satake et al. .................. 428/64
5,200,947 4/1993 Satake et al. .................. 369/275.1

*Primary Examiner*—Ali Neyzari
*Attorney, Agent, or Firm*—Sughrue, Mion, Zinn, Macpeak & Seas

[57] ABSTRACT

An optical information recording medium recordable of the analogue NTSC color video signal under the conditions of a high S/N ratio and a low jitter, and capable of being played by a commercially available LD player. The medium comprises: a transparent substrate on which pre-grooves are formed with a depth of 1450–2050 angstroms; an optical absorbing layer with an absorbance of 0.7–0.9 made of palladium phthalocyanine dye formed on the substrate, the absorbing layer having pits each having a changed reflectivity being duty-cycle modulated in response to a limited waveform which is formed through the steps of: adding at least one of a second FM carrier and a third pulse carrier to a first FM carrier having a first center frequency and a first frequency band, the second FM carrier having a second center frequency lower than the first center frequency and a second frequency band spaced from the first frequency band, the third pulse carrier having a pulse-repetition frequency lower than the second center frequency and a third frequency band spaced from the second frequency band, to form a frequency-division multiplex signal; and symmetrically clipping the multiplex signal to form the limited waveform; and reflecting layer formed on the optical absorbing layer.

4 Claims, 13 Drawing Sheets

BEFORE RECORDING

AFTER RECORDING d < D

INFORMATION RECORDING MEDIUM AND METHOD FOR RECORDING INFORMATION TO THE SAME

BACKGROUND OF THE INVENTION

1. Field of the Invention

The present invention relates to a writable information recording medium, and more particularly, to a writable information recording medium capable of being played back with a commercially available laser disk player, for example a compatible information recording medium to a laser disk (hereinafter "LD") capable of recording the analogue signal.

2. Description of the Related Art

There is an optical disk so-called Compact Disk (hereinafter "CD") widely used as a Read Only Memory (hereinafter "ROM") medium on which data has been prerecorded in the fields of audio recording and information processing. In the CD, pre-pits corresponding to data to be reproduced have previously been formed on a plastic substrate by an injection molding, and a reflective layer is formed on the pits-formed substrate, with a protective layer covering the top of the reflective layer. There are specifications for recording and reading some digital signals for this CD which is standardized and so called CD specifications. CD players, which conform to the CD specifications, are widely used as CD reproducing apparatuses, although this type of medium is no writable.

There is an optical disk on which pits are written once which is so-called CD-R capable of being used directly in available CD players aforementioned. This writable CD-R comprises an optical absorbing layer absorbing light formed on a plastic substrate with a 12 cm diameter, and a reflective layer is formed on the substrate. In the conventional CD-R, a cyanine dye is used for the absorbing layer and gold (Au) is used for the reflective layer. The digital signal is recorded for an audio signal in the CD-R.

On the other hand, there is no LD with a 30 or 20 cm diameter having an absorbing layer for recording pits on which an analog signal frequency-modulated for an audio signal is recorded, that is, a writable LD or re-cordable laser disk (LD-R) does not exist. There is therefore a strong demand for the development of such a writable LD or recordable laser disk, which conforms to the standards of the LD specifications and can be thus used directly in available LD players as in the similar manner of that of the CD-R.

However, in case that an analogue signal is recorded by using a semiconductor laser to an LD type optical disk having a recording layer or an optical absorbing layer made of the cyanine dye as used in CD-R, it is difficult to record pits on the optical absorbing layer because insufficiency of sensitivity of the optical absorbing layer at a high linear velocity rotation higher than that of a CD type optical disk. As a result, such an analogue signal recording in the LD type medium is not practical. Furthermore, a digital signal is recorded on the CD-R under the generous conditions of jitter in the CD specifications, but the analogue signal is recorded onto an LD type optical disk in the LD specifications. Therefore, influence of jitter or the like becomes serious in the LD type optical disk. Such an LD utilizing the cyanine dye for the absorbing layer does not fit to a practical usage of recording and reproducing for an analogue video signal.

SUMMARY OF THE INVENTION

It is an object of the present invention to provide an optical information recording medium recordable of an analogue signal such as the NTSC color video signal or the like under the conditions of a high S/N ratio and a low jitter by using a simple recording device including a semiconductor laser. Another object is to provide an optical information recording medium capable of being played by a commercially available LD player for reproducing such an analogue signal.

To achieve the foregoing objects in accordance with the present invention, there is provided an optical information recording medium comprises:

a transparent disk-shape substrate on which pre-grooves are concentrically or helically formed with a depth of 1450–2050 angstroms;

an optical absorbing layer with an absorbance of 0.7–0.9 made of a palladium phthalocyanine dye formed on a surface of said substrate, the absorbing layer having a plurality of pits each having a changed reflectivity being duty-cycle modulated in response to a limited waveform which is formed by a recording method comprising the steps of:

adding a first FM carrier having a first center frequency and a first frequency band and at least one of a second FM carrier and a third pulse carrier to each other, said second FM carrier having a second center frequency lower than said first center frequency and a second frequency band spaced from said first frequency band, said third pulse carrier having a pulse-repetition frequency lower than said second center frequency and a third frequency band spaced from said second frequency band, to form a frequency-division multiplex signal; and symmetrically clipping said frequency-division multiplex signal to form said limited waveform; and reflecting layer formed on said optical absorbing layer.

A method for recording information as pits to an optical information recording medium according to the present invention comprising: a transparent disk-shape substrate on which pre-grooves are concentrically or helically formed with a depth of 1450–2050 angstroms; an optical absorbing layer with an absorbance of 0.7–0.9 made of a palladium phthalocyanine dye formed on a surface of said substrate; and a reflecting layer formed on said optical absorbing layer, which comprises steps of:

forming a first FM carrier having a first center frequency and a first frequency band, forming at least one of a second FM carrier and a third pulse carrier; said second FM carrier having a second center frequency lower than said first center frequency and a second frequency band spaced from said first frequency band, said third pulse carrier having a pulse-repetition frequency lower than said second center frequency and a third frequency band spaced from said second frequency band, adding at least one of said second FM carrier and said third pulse carrier to said first FM carrier to form a frequency-division multiplex signal; and symmetrically clipping said frequency-division multiplex signal to form a limited waveform;

irradiating a laser beam turning on and off in response to said limited waveform onto said optical absorbing layer of said optical information recording medium rotating at a linear velocity of 10.1-11.4 m/sec. along said pre-groove to form a plurality of pits each having a changed reflectivity being duty-cycle modulated in response to said limited waveform.

There is provided an information recording medium according to the present invention comprises: an transparent substrate, an optical absorbing layer formed on said substrate, and a reflecting layer formed on said optical absorbing layer, characterized in that said optical absorbing layer is made of a metal phthalocyanine represented by the following formula:

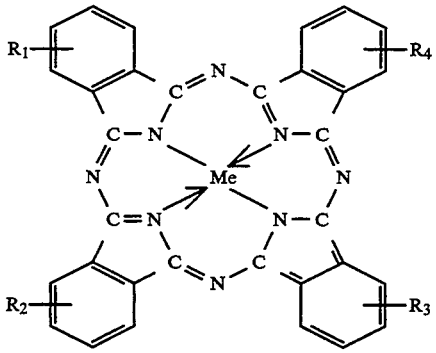

wherein Me represents palladium (Pd), copper (Cu), zinc (Zn), chromium (Cr), iron (Fe), cobalt (Co), nickel (Ni), platinum (Pt) or vanadium (V), $R_1$ and $R_4$ independently represent a hydrogen atom, a substituted or unsubstituted alkyl group, an alkoxy group or a halogen atom.

According to the present invention, the shape of the pits recorded on the absorbing layer is rectified in which each pit region changes in reflectivity, and further an analogue signal read from such regions has little jitter, so that the unwanted influence caused by the jitter is reduced. As a result, there are obtained an information recording medium and method for recording information with a high S/N ratio.

DETAILED DESCRIPTION OF THE PREFERRED EMBODIMENT

The following is a detailed description for an embodiment of an optical information recording medium according to the present invention with reference to the accompanying drawings.

Figure 1:
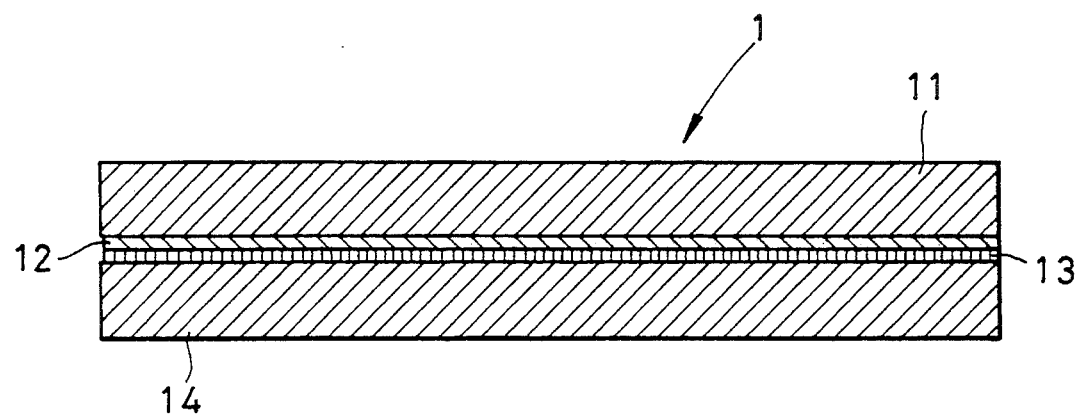
FIG. 1 is a partly enlarged cross section view of an information recording medium according to the present invention.

FIG. 1 illustrates a partly enlarged cross section view of the information recording medium of the embodiment. The information recording medium 1 has a recording layer 12 formed on a substrate 11 having a light transmission property, and a light-reflective layer 13 formed on the recording layer 12, with a protective layer 14 disposed on the light-reflective layer 13.

Figure 2:
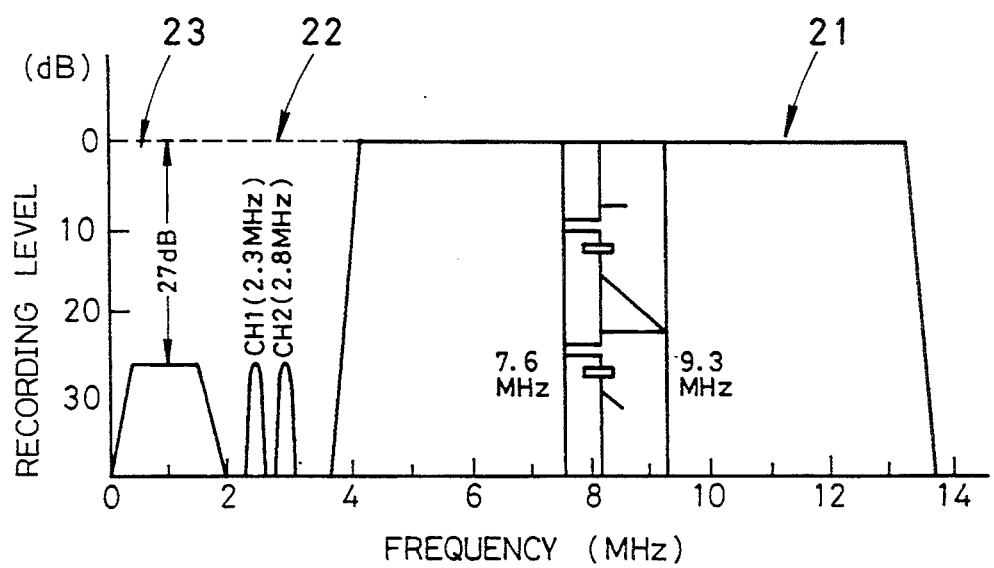
FIG. 2 is a graph showing a frequency spectrum of frequency-division multiplex signal recorded on an optical disk according to a preferred embodiment.

FIG. 2 shows a frequency spectrum of frequency-division multiplex signal recorded on the optical absorbing layer 12 corresponding to a plurality of pits changed in reflectivity, the multiplex signal comprising a video FM signal 21, e.g. the NTSC color video signal or the like, an audio FM signal 22, and an audio digital signal 23 of audio and/or code date or the like. In other words, the video FM signal 21 of a first FM carrier has the first center frequency 8.5 MHz (frequency shift +−1.7 MHz), the tip of sync frequency 7.6 MHz, the white peak frequency 9.3 MHz and the band width about 4-14 MHz (first frequency band). The audio FM signal 22 of a second FM carrier has second frequency bands of 2 channels of the second center frequencies 2.3 MHz and 2.8 MHz (frequency shift +−100 kHz), each second frequency band separating on the lower frequency side from the video FM signal 21 of the first frequency band. The audio digital signal 23 of the pulse carrier has a third frequency band separating on the lower frequency side (2 MHz or less) from the audio FM signal 22 of the second frequency band, that is, pulse-repetition frequency lower than the second center frequency of the audio FM signal. The frequency-division multiplex signal of a composite signal comprising the video FM signal 21, the audio FM signal 22 and the audio digital signal 23 may be recorded as a row of pits. The composite signal except the audio FM signal 22 may be recorded. As seen from the spectrum recorded signal shown in the figure, the video FM signal band is ended at about 4 MHz and the lower side band of the video FM carrier does not overlapped with that of the audio FM carrier. In addition, the pulse carrier does not overlapped with other carrier nor there is any leakage of the carrier.

The substrate 11 is a disk shape. From the view point of improving the productivity, it is preferable to use an injection-molded resin for the substrate 11 to integrally formed with a pre-groove. For example, this substrate may be formed of a transparent material, such as polycarbonate resins (PC) or polymethyl methacrylates (PMMA). Particularly, it is preferred to use polycarbonate resins (PC) with an average molecular weight of 32,000 to 40,000. The material of the substrate 11 is not limited to such integrally formed injection-molded resins, but the substrate may be formed by the 2P (photopolymer) method in which a transferring layer made of a fluid UV curable resin having a pre-groove is applied to the substrate after that the UV ray is irradiated thereto. The thickness of the thus formed substrate 11 is about 1.0 to 1.5 mm.

The pre-groove having a depth of 1450–2050 angstroms (0.145–0.2050 μm) and a width of 0.35–0.55 μm is previously formed on the surface of the substrate 11 on which the optical absorbing layer should be formed. The depth of the pre-groove is preferable in a range of 1700–2000 angstroms. The depth range of the pre-groove is optimized and set on the basis of the test for recording the multiple signal mentioned latter. The pitch of the pre-groove is in 1.6–2.0 μm, preferably 1.7–1.8 μm, which is wider than that of the track or pre-groove in the LD, CD and CD-R (1.4–1.6 μm). This wide is set to take care of cross-talk in the LD-R. The pre-groove may be sinuously formed at a predetermined period. The period of the sinusoidal movement may be modified to store a signal such as an address signal. In case that the signal as shown in FIG. 2 is recorded in LDD (Laser vision with Digital sound Disk) specifications, the frequency of the sinusoidal movement is selected from a range value at which the sinusoidal frequency and the band of the digital signal (EFM audio signal) in the CD specifications does not overlap each other.

The palladium phthalocyanine used for the optical absorbing layer is represented by the following formula:

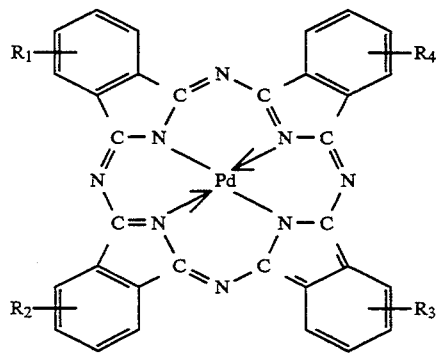

wherein $R_1$ and $R_4$ independently represent a hydrogen atom, a substituted or unsubstituted alkyl group, an alkoxy group or a halogen atom.

A chelate dye of palladium phthalocyanine having a central metal of palladium (Pd) is stable even in a solvent and has an excellent durability superior to a conventional cyanine dye.

The recording layer 12 containing the palladium phthalocyanine dye is applied on the substrate 11 by typical means such as a spin coating method using the solution thereof.

The thickness of the recording layer 12 to be coated is predetermined at a thickness satisfying an absorbance of 0.7 to 0.9. When the absorbance becomes less than 0.7, light absorption is reduced so that the sensitivity in the wavelength of the semiconductor laser lowers, disabling the recording of signals. When the absorbance exceeds 0.9, the dye layer becomes thick to thereby increase the light absorption while undesirably reducing the reflectance. In this case, absorbance is represented by $E=\log_{10}(Io/Ii)=k*c*l$, wherein Ii denotes a quantity of incident light, Io denotes a quantity of output light, k denotes a constant, c denotes a concentration of the palladium phthalocyanine dye in the optical absorbing layer, 1 denotes a thickness of the optical absorbing layer 12. In addition, the range of absorbance of the optical absorbing layer is optimized and set on the basis of the test for recording the multiple signal mentioned latter.

The optical absorbing layer may be made of a metal phthalocyanine represented by the following formula:

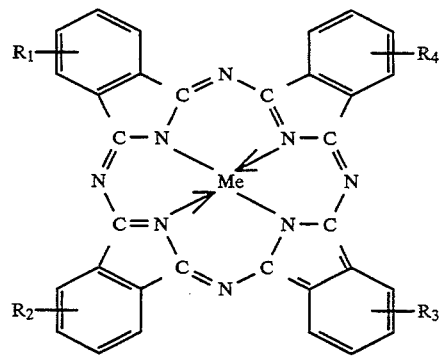

wherein Me represents palladium (Pd), copper (Cu), zinc (Zn), chromium (Cr), iron (Fe), cobalt (Co), nickel (Ni), platinum (Pt) or vanadium (V), $R_1$ and $R_4$ independently represent a hydrogen atom, a substituted or unsubstituted alkyl group, an alkoxy group or a halogen atom. The metal phthalocyanine dyes are also stable even in a solvent.

Various types of known solvents can be used for coating the recording layer 12; they include diacetone alcohol, ethyl cellosolve, methyl cellosolve, isophorone, methanol and tetrafluoropropanol.

The light-reflective layer 13 is provided on the recording layer 12 coated on the substrate 11. The light-reflective layer 13 is formed of a metal such as Au, Ag, Cu or Al, and the film-formation is carried out by vacuum vapor deposition, sputtering, ion plating or the like. The thickness of the light-reflective layer 13 is about 0.03 to 0.6 μm.

The protective layer 14 is usually provided on the light-reflective layer 13 to protect the recording layer (light-absorbing layer) 12 and the light-reflective layer 13. In general, the protective layer 14 is formed by coating an ultraviolet-hardening resin on the light-reflective layer 13 by spin coating and then irradiating ultraviolet rays on the resultant structure to harden the coated film. Other possible materials for the protective layer 14 include epoxy resins, acrylic resins, silicone resins and urethane resins. The thickness of the protective layer 14 is generally about 0.1 to 100 μm.

In addition, an intermediate layer may be provided between the substrate 11 and the light-absorbing layer 12 to protect the substrate 11 from the solvent. An intermediate layer may be provided between the light-absorbing layer 12 and the light-reflective layer 13 to improve efficiency for the light absorption. In addition, an intermediate layer may be provided between the optical absorbing layer 12 and the reflecting layer 13 to improve an efficiency of absorbing light. In other words, a thin layer made of $SiO_2$, $SiO_4$, MgF, ZnS, PVA, PMMA, fluorocarbon resins or the like may be formed at least one between the transparent substrate and the optical absorbing layer, between the optical absorbing layer and the reflecting layer, and between the reflecting layer and the protecting layer, in order to improve the recording and reproducing property and its reliability or durability. Furthermore, for another structure of the disk, two of such optical disks may be prepared and adhered each other in such a manner that the protective layers 14 of the two are inside. In this case, a cohesive substance, a hot-melt type adhesive, an urethane adhesive, an epoxy adhesive or the like may be used for the sticking of the disks with or without the protective layer 14.

Figure 3:
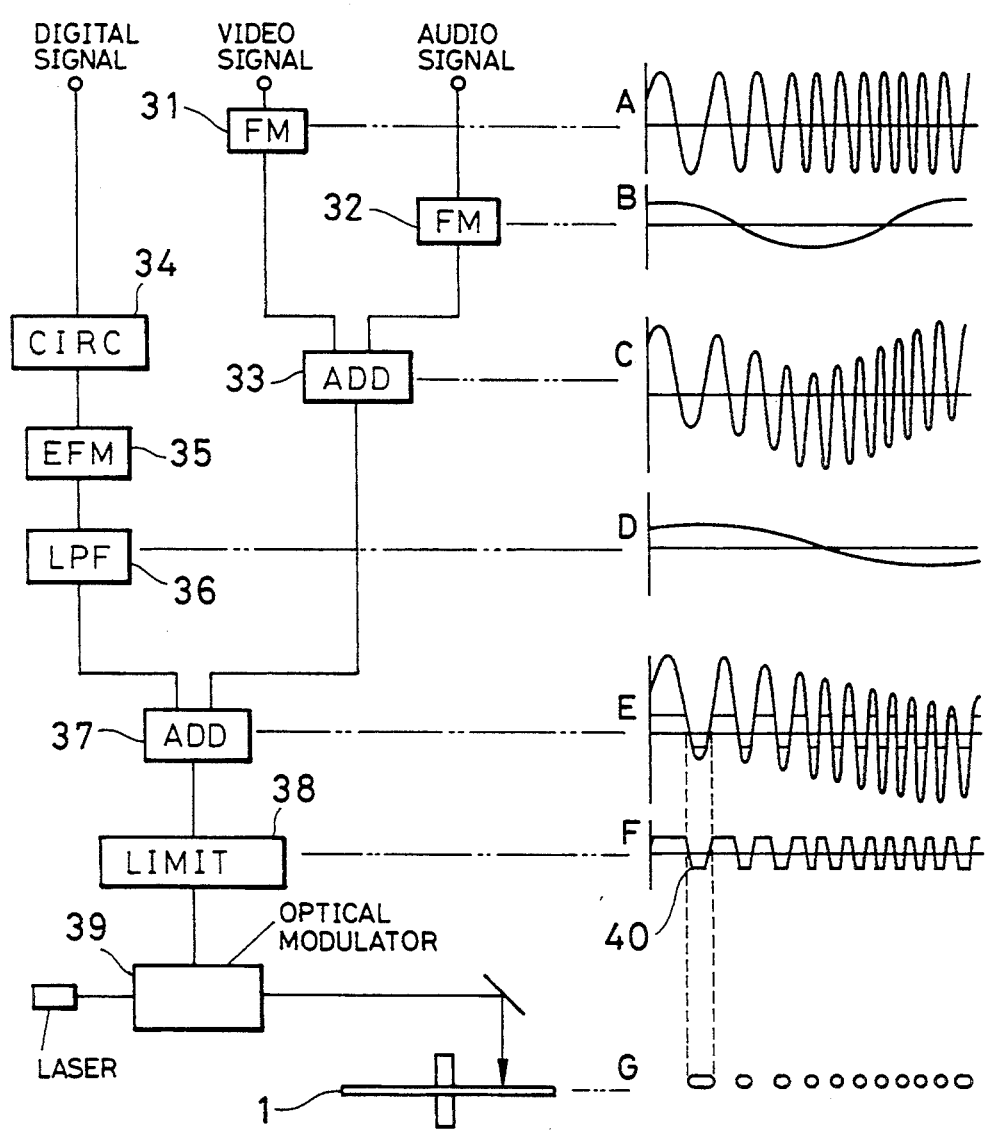
FIG. 3 is a block diagram showing a recording system for recording frequency-division multiplex signal onto an optical disk together with waveforms of signal in the steps thereof.

FIG. 3 shows a method for recording information according to the present invention. A video signal to be recorded is applied to a first FM modulator 31 so as to be frequency-modulated by a carrier with the center frequency 8.5 MHz into a video FM waveform (see mark A of FIG. 3). An audio signal to be recorded is applied to a second FM modulator 32 so as to be frequency-modulated by a carrier with the center frequency 2.3 MHz (and/or 2.8 MHz) into an audio FM waveform (see mark B of FIG. 3). Each of the video and audio FM waveforms is applied to an adder 33 to be combined and transformed into a frequency-division multiplex signal (see mark C of FIG. 3). In case of the LDD (Laser vision with Digital sound Disk) on which a digital signal such as an audio signal, code data or the like is recorded, such an audio digital signal converted by an analogue- digital convertor is applied through an encoder 34 for error detecting code such as CIRC or the like to an EFM (Eight-to-Fourteen Modulation) circuit 35 to pass through a low-pass filter (LPF) 36 of 2 MHz or less and transformed into an EFM waveform (see mark D of FIG. 3). The frequency-division multiplex signal (see mark C of FIG. 3) and the EFM waveform (see mark D of FIG. 3) are applied to a second adder 37 respectively, and combined and transformed into a second frequency-division multiplex signal (see mark E of FIG. 3).

The second frequency-division multiplex signal (see mark E of FIG. 3) is applied to a limiter 38, in which the multiplex signal waveform is clipped symmetrically and transformed into a rectangle limited waveform (see mark F of FIG. 3). As a result, the repetition frequency component with a duty ratio 50% represents a video FM signal data, and then the frequency component of the deviation from the duty ratio 50% represents an audio FM signal data and the EFM data in the multiple signal of the rectangle waveform, i.e., a duty-cycle modulated waveform. The duty-cycle is a pulse-like cycle waveform in which the ratio of pulse width to 1 cycle is so-called a duty ratio. The adding ratio of the video and audio FM waveforms and the EFM waveform is selected on the basis of consideration of the modulation linearity, the cross modulation and the S/N ratio.

The limited waveform (see mark F of FIG. 3) is applied to an optical modulator 39, thereby controlling "On" and "Off" of a laser beam in response to the limited waveform when the optical information recording medium 1 is rotated at a constant linear velocity in the range of 10.1-11.4 m/sec. by a spindle motor, so that the pulsed laser beam is irradiated along the pre-groove on the optical absorbing layer. While recording data, the optical head projecting the laser beam is moved from the inner peripheral to the outer of the rotating optical disk by a carriage motor. Concretely, a semiconductor laser device emits and irradiates a 770-800 nm wavelength laser beam on the transparent substrate 11 of the optical information recording medium 1 as shown in FIG. 1. The irradiated laser beam passes through the transparent substrate 1 to the optical absorbing layer 12 containing the palladium phthalocyanine dye. When the laser beam reaches the absorbing layer, the palladium phthalocyanine dye changes rapidly and the irradiated portions are modified to a plurality of pits each changing reflectivity in the optical absorbing layer corresponding to the limited waveform 40 (see a pit pattern G in FIG. 3).

In this way, the optical data can be recorded on the basis of both the frequency of limited waveform or pits and the duty ratio thereof in the recording method according to the present invention. This is due to the conditions of the absorbing layer material of palladium phthalocyanine and the pre-groove measurement to form more precisely the pit-shape, particularly pit-shapes of front and rear ends in the direction of track or time axis, in comparison with that of CD specifications.

It is necessary to form precisely pits corresponding to the limited waveform in the LDD specifications. If not so precisely form pits as CD-R, the S/N ratio is not maintained at a high level and it is difficult to suppress jitter. In case of CD-R, the optical absorbing layer changes in color per se and deforms the substrate in such a manner that the substrate melts at the laser-irradiated portion by a laser beam heating. It is therefore difficult to form precisely a pit-shape for recording data.

Example 1

Inventors therefore studied the material of the optical absorbing layer, the absorbance of the absorbing layer and the measurements of the pre-groove used for an optical disk capable been formed precise pits suitable for the method for recording the analogue multiple signal above mentioned.

A polycarbonate resin (PC) having refractive index n=1.58 was used for transparent substrates. A pre-groove was formed on the surface of each substrate at a width of 0.2-0.6 micrometer and a depth of 500-2500 angstroms. An absorbing layer made by the palladium phthalocyanine dye ($R_1$-$R_4$ are hydrogens) represented by the formula 1 above mentioned was formed at a thickness of about 666-2333 angstroms (absorbance 0.4-1.4) on the surface of the pre-groove side of the disk. A reflecting layer 13 made of Au was formed at thickness 1000 angstroms. A protective layer 14 made of an UV curable resin was formed at a thickness of 10-20 micrometer. In this way, various optical disks were manufactured. Inventors measured the properties of these optical disks.

First, a laser beam with wavelength 780 nm emitted from a semiconductor laser was modulated at a frequency of 2-16 MHz to form a limited FM waveform with duty ratio 50%. This limited waveform was recorded on the optical absorbing layer made of the palladium phthalocyanine dye. After that, properties of the C/N ratio and the jitter in the reproduced signal to frequencies were measured under the conditions of the constant linear velocity 11.4 m/sec. and the recording power 1.0 mW of the laser.

Figure 4:
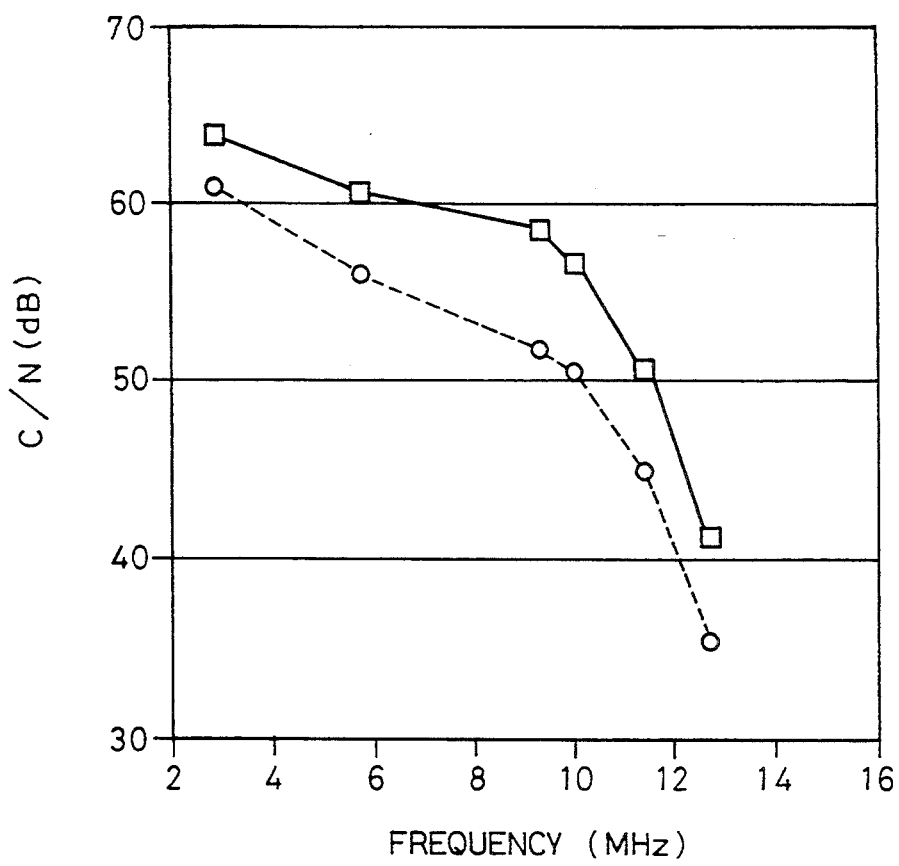
FIG. 4 is a graph showing curves of C/N ratio and frequency properties of both the disks of a preferred embodiment and a comparative example.

As a result, as seen from FIG. 4 (the solid line), the C/N ratio—frequency property is maintained at a high C/N ratio value about 60 dB in the frequency range of 2–10 MHz, by using the palladium phthalocyanine dye for the absorbing layer. Similarly, as seen from FIG. 5 (the solid line), the jitter—frequency property is maintained at a low jitter level about 4 nsec., by using the palladium phthalocyanine dye for the absorbing layer.

Comparative Example 1

Comparative optical disks were manufactured in the same manner of example 1 excepting that the optical absorbing layers were made of the cyanine dye represented by the following formula:

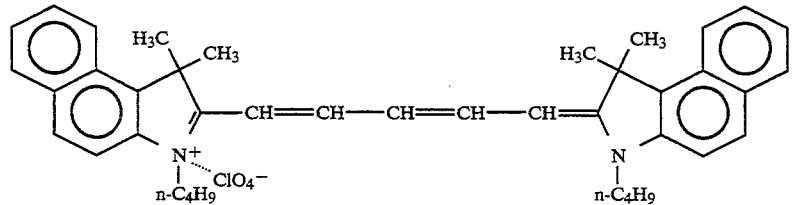

The same limited waveform as example 1 was recorded on the optical absorbing layer made of the cyanine dye. Properties of the C/N ratio and the jitter in the reproduced signal to frequencies were measured under the same conditions of example 1. As a result, FIG. 4 (the dot line) shows the C/N ratio frequency property and FIG. 5 (the dot line) shows the jitter frequency property. These properties are apparently inferior to those of example 1.

Example 2

The limited FM waveform was recorded on the optical disk of example 1 in the same manner of example 1 except the recording power of 19.0 mW. After that, properties of the C/N ratio and the jitter in the reproduced signal to pit-lengths were measured under the same conditions of example 1.

Figure 6:
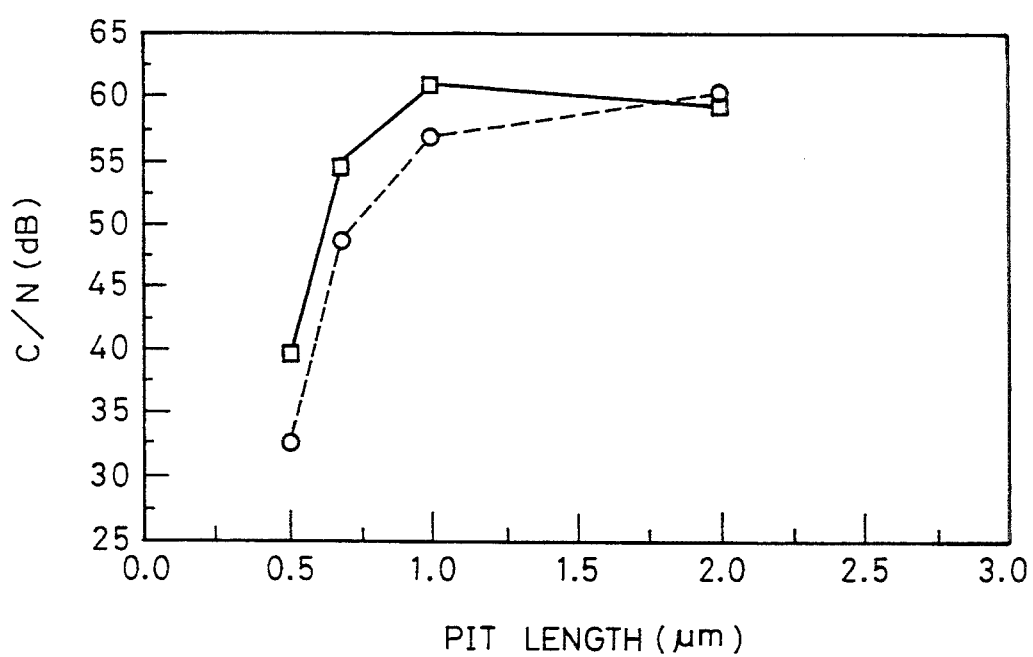
FIG. 6 is a graph showing curves of C/N ratio and pit-length properties of both the disks of a preferred embodiment and a comparative example.
Figure 7:
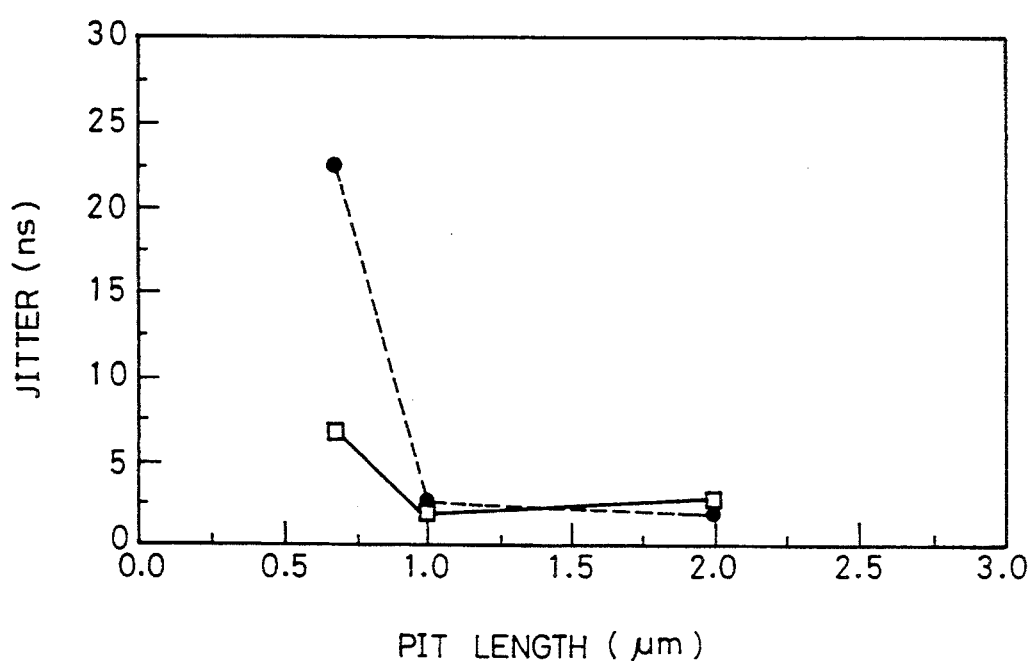
FIG. 7 is a graph showing curves of jitter and pit-length properties of both the disks of a preferred embodiment and a comparative example.

As a result, as seen from FIG. 6 (the solid line), the C/N ratio vs. pit-length property is maintained at a high C/N ratio value about 60 dB in the pit length range of 1.0–2.0 micrometer, by using the palladium phthalocyanine dye for the absorbing layer. Similarly, as seen from FIG. 7 (the solid line), the jitter vs. pit length property is maintained at a low jitter level about 7 nsec. or less in the pit length range of 0.4–1.0 micrometer, preferably about 2 nsec. in the pit length range of 1.0–2.0 micrometer.

(Comparative Example 2

The pit-length vs. C/N ratio and jitter property is measured under the same conditions of example 2 excepting that the cyanine dye represented by the formula 2 is used for the optical absorbing layer. As a result, as seen from FIG. 6 (the dot line) showing the C/N ratio vs. pit length property and FIG. 5 (the dot line) showing the jitter vs. pit length property are inferior to those of example 2.

Example 3

A duty 40% EFM waveform (multiple signal) was recorded on the optical disks of example 1 each having the pre-groove of the width 0.45 micrometer and depth 1450 angstroms, under the same conditions of example 1. The disks have the optical absorbing layer of the palladium phthalocyanine dye with the thickness of about 666–2333 angstroms (absorbance 0.4–1.4). Both properties of the S/N ratio and bit error rate (BER) vs. absorbance of this optical absorbing layer were measured.

Figure 5:
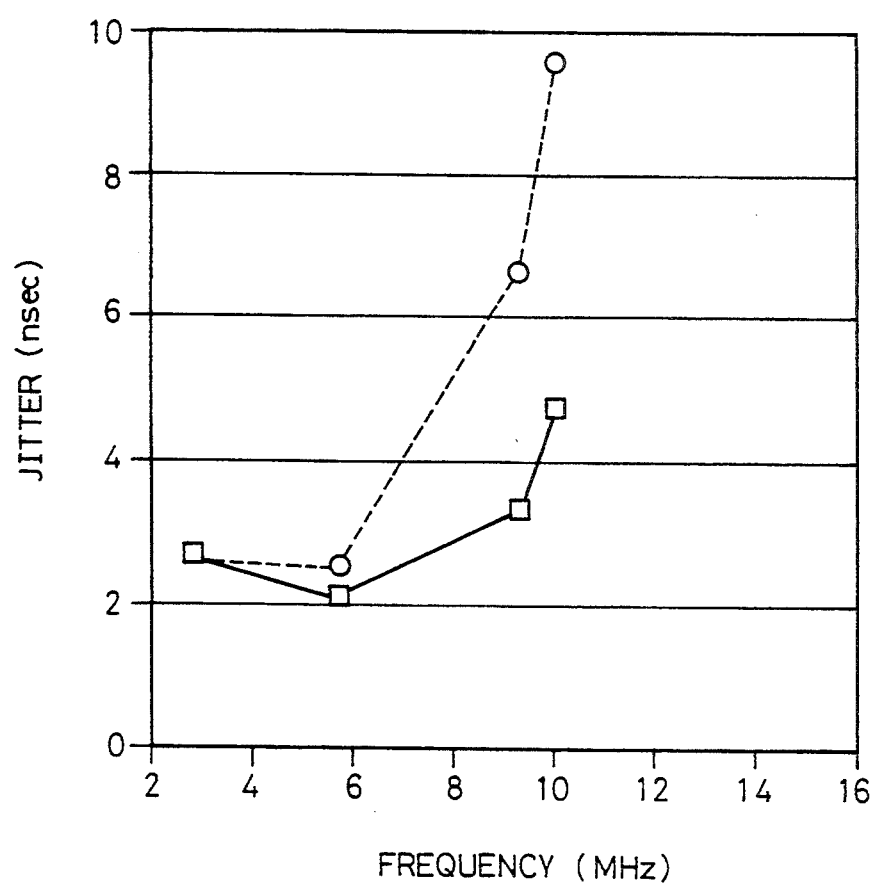
FIG. 5 is a graph showing curves of jitter and frequency properties of both the disks of a preferred embodiment and a comparative example.

FIG. 5 (the solid line), the jitter—frequency property is maintained at a low jitter level about 4 nsec. by using the palladium phthalocyanine dye for the absorbing layer.

Figure 8:
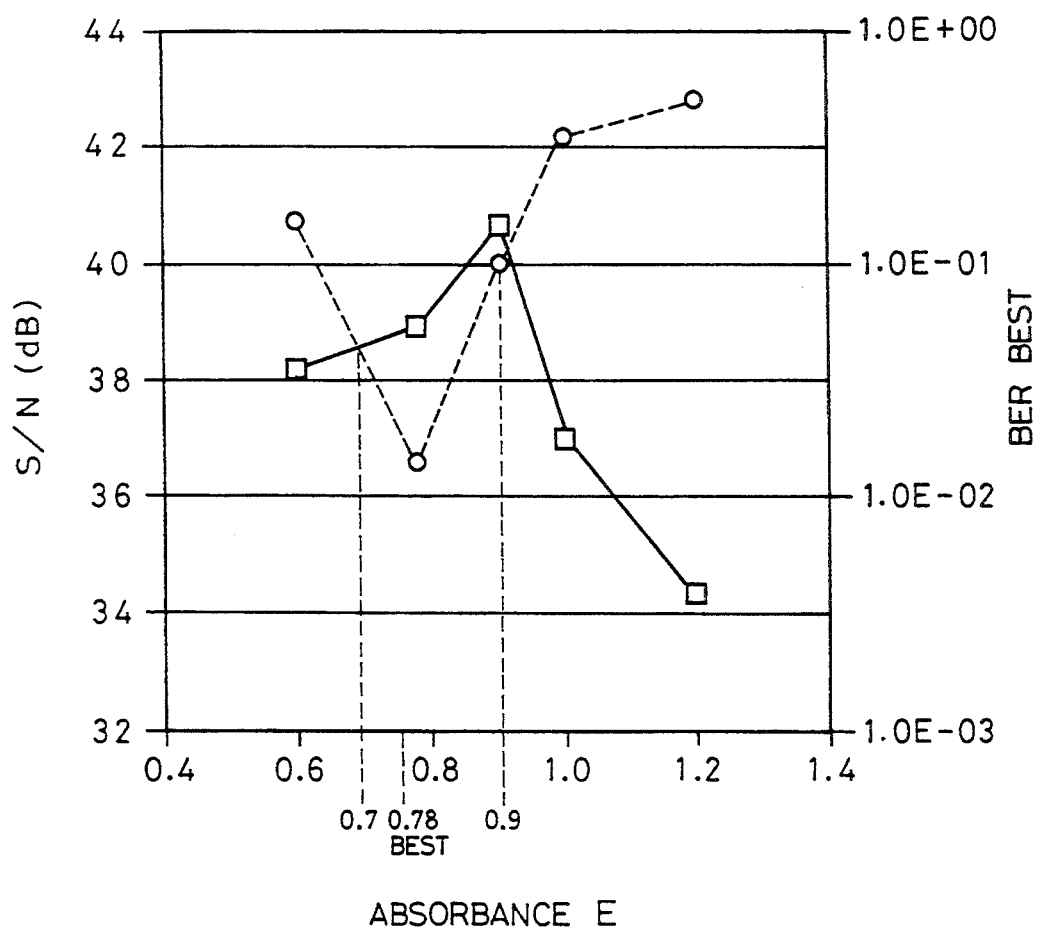
FIG. 8 is a graph showing curves of S/N ratio and bit error rate properties a preferred embodiment with respect to the absorbance of an optical absorbing layer.

As a result, as shown in FIG. 8 (the solid line), the S/N ratio—absorbance property has the maximum S/N ratio at absorbance 0.9. The BER—absorbance property has the minimum BER at 0.78 absorbance (thickness is about 1300 angstroms) as seen from FIG. 8 (the dot line). It is understood that, as seen from both the properties above mentioned, an absorbance of 0.7–0.9 is preferable for the optical absorbing layer of the palladium phthalocyanine dye.

Example 4

The optical disks used in example 1 each having a pre-groove width 0.45 μm and an optical absorbing layer of the palladium phthalocyanine dye with absorbance 0.78. The disks have a pre-groove depth of 500–2500 angstroms. A duty 40% EFM waveform (multiple signal) was recorded on the optical disks, under the same conditions of example 1. After that, both properties of the S/N ratio and bit error rate (BER) vs. pre-groove depth were measured.

Figure 9:
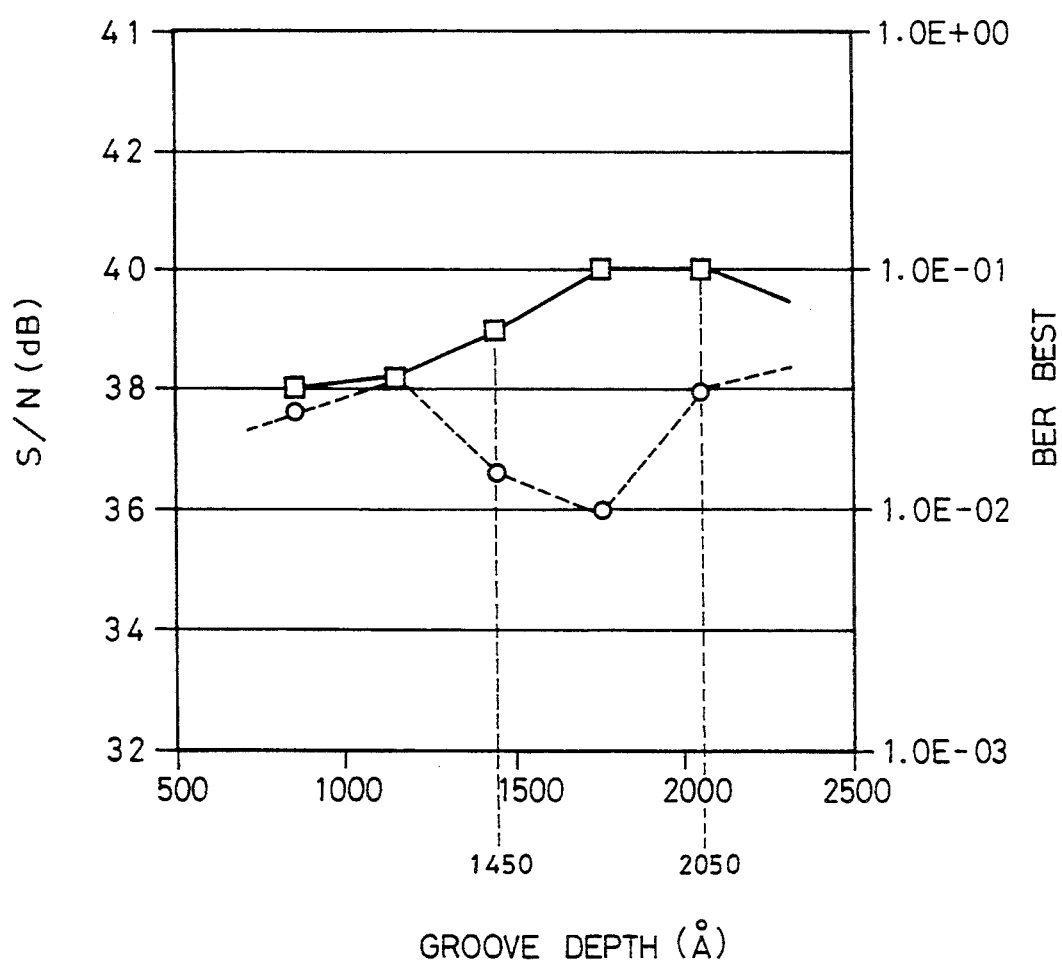
FIG. 9 is a graph showing curves of S/N ratio and bit error rate properties of a preferred embodiment with respect to pre-groove depth in an optical disk of Example.

As a result, as shown in FIG. 9 (the solid line), the S/N ratio—pre-groove depth property has the maximum S/N ratio at a range of 1750–2000 angstroms in pre-groove depth. The BER—pre-groove depth property has the minimum BER at depth 1750 angstroms as seen from FIG. 9 (the dot line). It is understood that, as seen from both the properties above mentioned, a pre-groove depth range of 1450–2050 angstroms is preferable for the pre-groove of the optical disk.

Example 5

The optical disks used in example 1 each having a pre-groove depth 1450 angstroms and an optical absorbing layer of the palladium phthalocyanine dye with absorbance 0.78. The disks have pre-groove width of 0.2–0.6 micrometer. A duty 40% EFM waveform (multiple signal) was recorded on the optical disks, under the same conditions of example 1. After that, both properties of the S/N ratio and BER vs. pre-groove width were measured.

Figure 10:
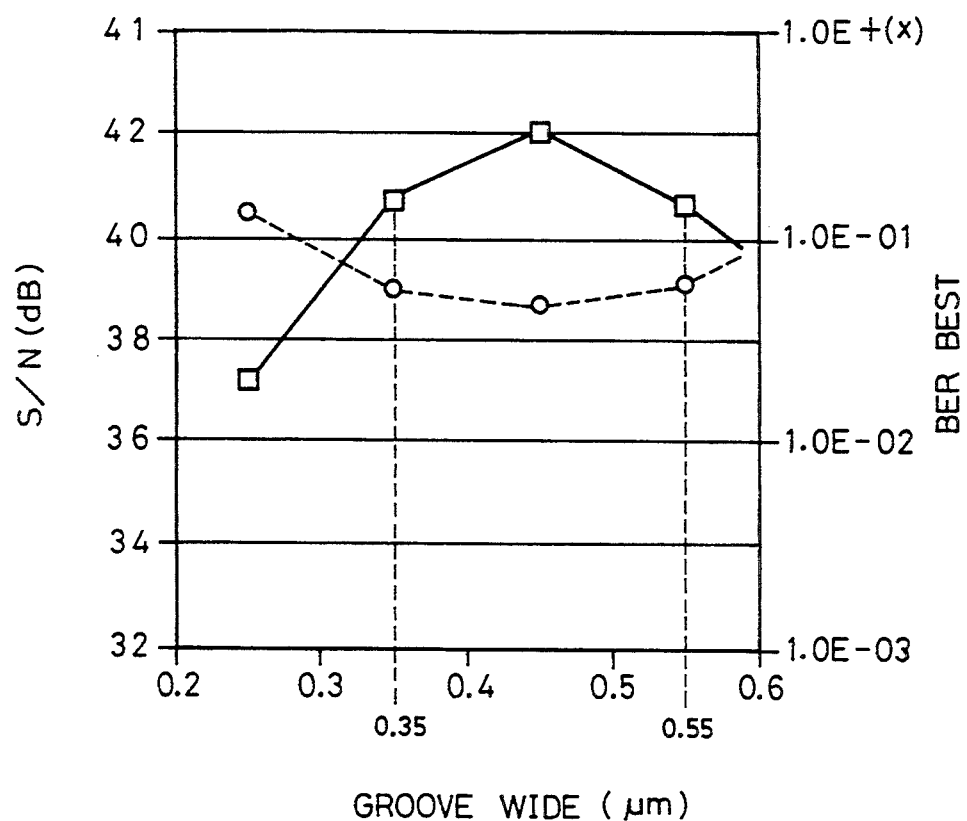
FIG. 10 is a graph showing curves of S/N ratio and bit error rate properties of a preferred embodiment with respect to the pre-groove width in an optical disk of Example.

As a result, as shown in FIG. 10 (the solid line), the S/N ratio—pre-groove width property has the maximum S/N ratio at 0.45 width. The BER—pre-groove width property has the minimum BER at depth 0.45 micrometer as seen from FIG. 10 (the dot line). It is understood that, as seen from both the properties above mentioned, a pre-groove width range of 0.35–0.55 micrometer is preferable for the pre-groove of the optical disk.

Comparative Example 3

An optical disk was formed as a comparative example 3 which had a pre-groove with 300 angstroms depth and an optical absorbing layer made of the palladium phthalocyanine dye on the basis of the CD specifications. An example optical disk included in the examples above-mentioned was also formed in the same manner of example 3 except the depth of pre-groove of 1400 angstrom in the LDD specifications. These optical disks were formed in order to investigate the influence of the optical absorbing layer and the substrate upon recording data.

Comparative example 3 was rotated at a low linear velocity 1.2 m/sec. in accordance with the CD specifications and then, the EFM signal was pit-recorded at a recording power 7 mW to forms a plurality of 1 micrometer length pits. The video FM signal was recorded at a recording power 19 mW to form 0.5 micrometer length pits on the example optical disk.

After the recording data, the protective layer and the reflecting layer were pealed by an adhesive tape and then, the disks were dipped in a pool of an ultrasonic washer device filled with a solution such as dimethylcyclohexthane, ethylcyeclohexthane methanol or the like and vibrated for 10 minutes to cleanse out the optical absorbing layer. After the solution dried, the bottoms of the pre-grooves portions of the substrate disks were observed by an ion electron microscope.

There was a change of the pre-groove bottom of comparative example 3. The pre-groove bottom increased at the recess portion of 1 micrometer pit-length by about 500 angstroms after recording. As a whole, the depth become about 800 angstroms. On the other hand, there was no change of depth of the pre-groove in the example disk.

It may be understood that the recording mechanisms between comparative example 3 in the CD specifications and the example disk according to the present invention. In comparative example 3 in the CD specifications having a shallow pre-groove and a thin optical absorbing layer, date is recorded as pits of the pre-groove formed by heat caused by a chemical change of the palladium phthalocyanine absorbing layer absorbing the laser beam and the change of an optical constant of the palladium phthalocyanine absorbing layer.

On the other hand, it may be understood that, in the example optical disk, data is recorded as only a change of the optical constant such as the reflecting index. The difference of the recording mechanism from that of the CD-R requires the specific size or measurement of the pre-groove and the range of absorbance of the optical absorbing layer made of palladium phthalocyanine in order to record precisely the duty-cycle modulated frequency-division multiplex signal or the limited waveform of the absorbing layer as a pit-row pattern.

Figure 11A:
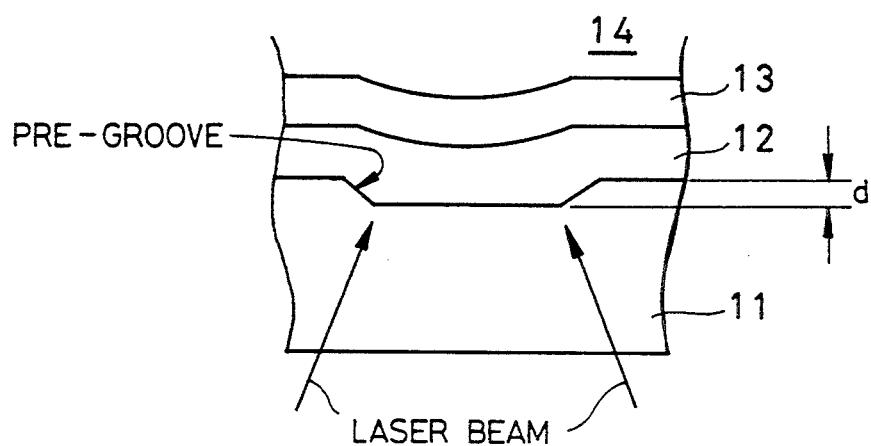
FIGS. 11A and 11B are partly enlarged cross section views of optical disks of Example (FIG. 11B) and Comparative example (FIG. 11A) each cut away perpendicular to a track direction showing sectional views of a formed pit before recording and after recording.
Figure 11A:
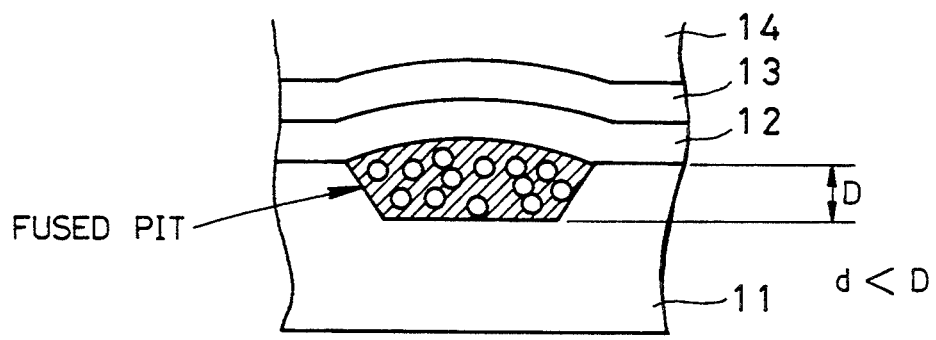
Figure 11B:
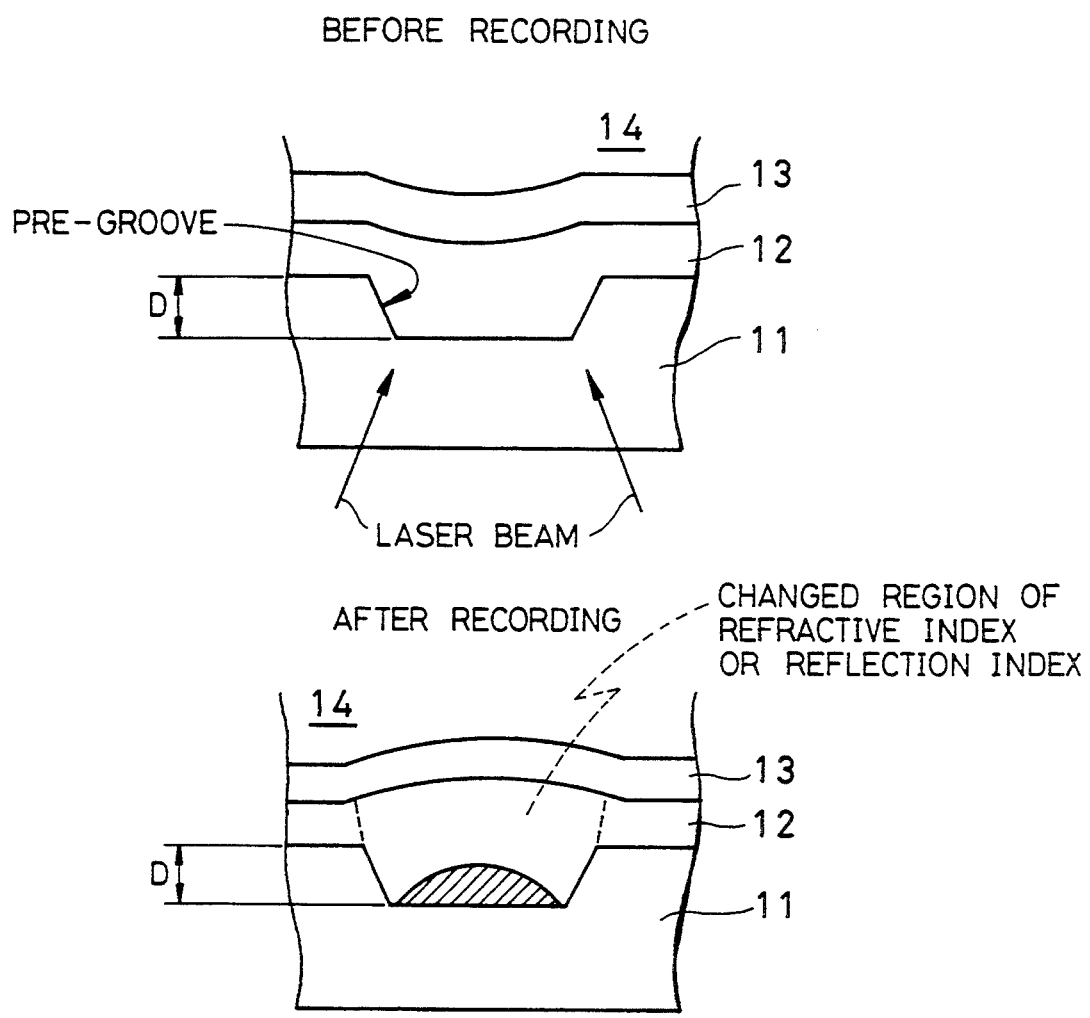

In other words, when the cross-sections of the recorded pits were observed before and after this test, the palladium phthalocyanine used in the example LD-R optical disk was decomposed by the heat of the laser beam, and the change region of refractive index or reflection index occurs only in the absorbing layer (as shown in FIG. 11B) to maintain the depth of the pre-groove. In the comparative example of CD-R, the substrate material and the metal phthalocyanine absorbing layer were heat-decomposed and fused as a pit, so that the depth of the recorded pit after recording was deeper than that of the pre-groove before recording (FIG. 11A).

Figure 12A:
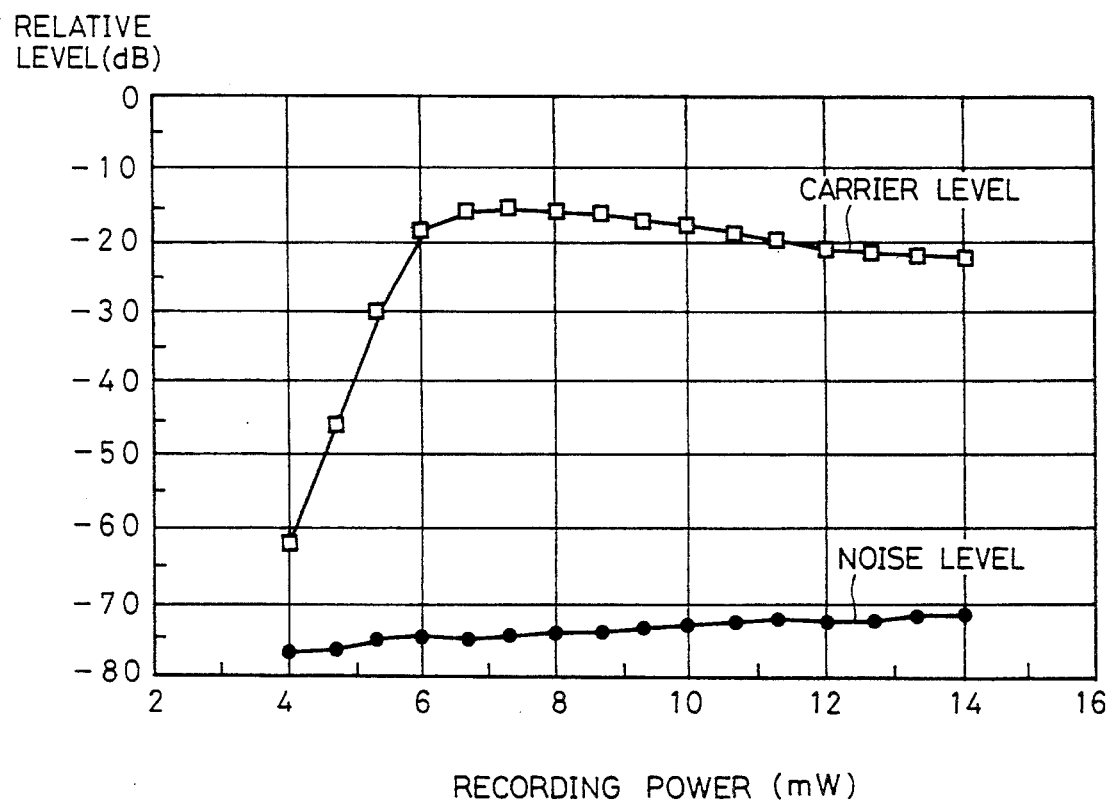
FIGS. 12A and 12B are graphs showing relative levels of carrier and noise of examples (FIG. 12A) and comparative examples (FIG. 12B) with respect to recording powers irradiated to optical disks.
Figure 12B:
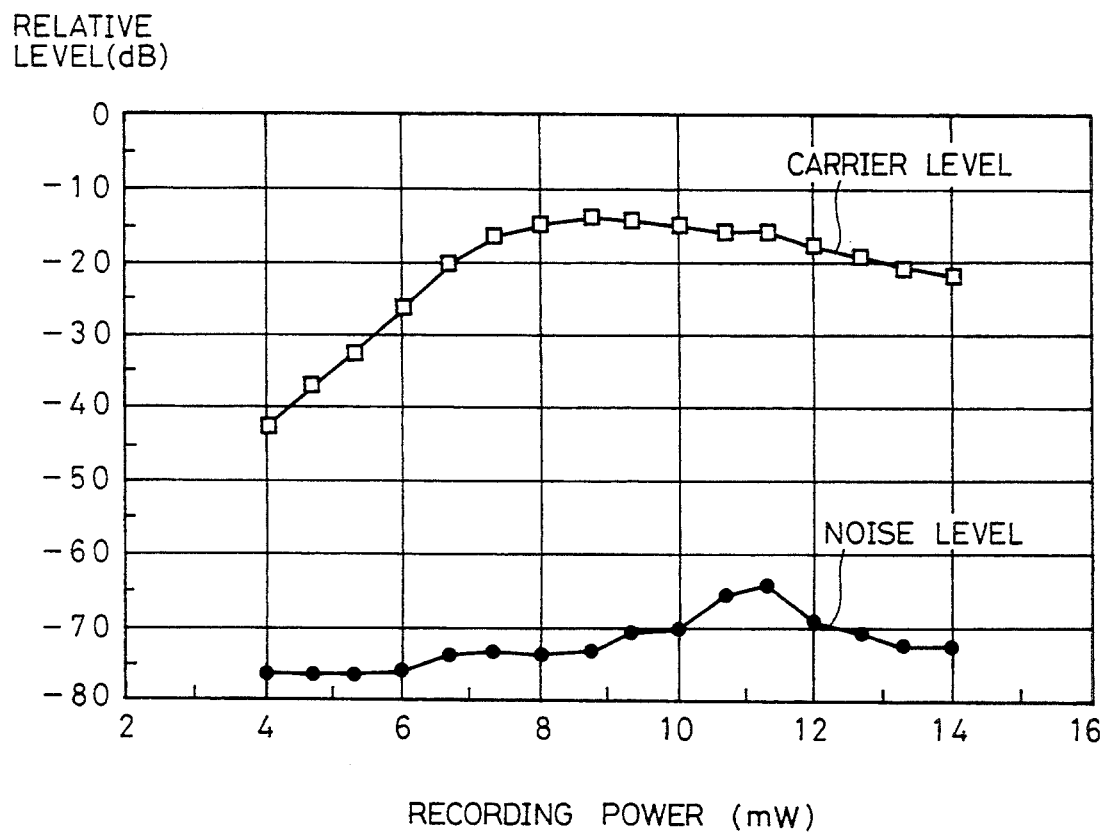

Furthermore, the change of the relative levels of carrier and noise with respect to the recording power were measured in the present example disk and the comparative disk. FIG. 12A shows a result of the present example and FIG. 12B shows a result of the comparative example. In , the recording power 4–6 mW, the carrier level of the example (FIG. 12A) raises steeper than that of the comparative example (FIG. 12B).

In the example optical disk using palladium phthalocyanine for the optical absorbing layer, the shape of the end of the recorded pit in the track direction even becomes a steep slope if the disk is under a high linear-velocity condition, since the pit is formed clearly. This achieves a reduced jitter and a high S/N ratio in the reproduced signal.

Comparative Example 4

A comparative optical disk was manufactured in the same manner of example 1 excepting that the optical absorbing layer were made of silicon phthalocyanine dye represented by the following formula:

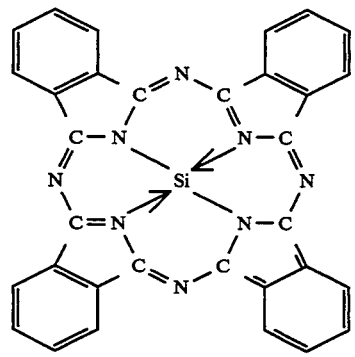

The same limited waveform as example 1 was recorded on the optical absorbing layer made of the cyanine dye. The S/N ratio in the reproduced signal to the frequency was measured under the same conditions of example 1. As a result, the S/N ratio was 36.8 dB.

According to the present invention, the optical information recording medium or LDD disk has pre-grooves with a depth 1450–22050 angstroms and an optical absorbing layer of absorbance 0.7–0.9 made of the palladium phthalocyanine dye. The present invention achieves to form precisely pits suitable to record a duty-cycle modulated frequency-division multiplex signal as pits to maintain a high S/N ratio.

What is claimed is:

1. An optical information recording medium comprising:
   a transparent disk-shape substrate on which pre-grooves are concentrically or helically formed with a depth of 1450–2050 angstroms;
   an optical absorbing layer with an absorbance of 0.7–0.9 made of a palladium phthalocyanine dye formed on a surface of said substrate, the absorbing layer having a plurality of pits each having a changed reflectivity being duty-cycle modulated in response to a limited waveform which is formed by a recording method comprising the steps of:

adding a first FM carrier having a first center frequency and a first frequency band and at least one of a second FM carrier and a third pulse carrier to each other, said second FM carrier having a second center frequency lower than said first center frequency and a second frequency band spaced from said first frequency band, said third pulse carrier having a pulse-repetition frequency lower than said second center frequency and a third frequency band spaced from said second frequency band, to form a frequency-division multiplex signal; and symmetrically clipping said frequency-division multiplex signal to form said limited waveform; and reflecting layer formed on said optical absorbing layer.

2. An optical information recording medium according claim 1, wherein said pre-groove has a width of 0.35–0.55 micrometer.

3. A method for recording information as pits to an optical information recording medium comprising: a transparent disk-shape substrate on which pre-grooves are concentrically or helically formed with a depth of 1450–2050 angstroms; an optical absorbing layer with an absorbance of 0.7–0.9 made of a palladium phthalocyanine dye formed on a surface of said substrate; and a reflecting layer formed on said optical absorbing layer, which comprises steps of:

forming a first FM carrier having a first center frequency and a first frequency band, forming at least one of a second FM carrier and a third pulse carrier; said second FM carrier having a second center frequency lower than said first center frequency and a second frequency band spaced from said first frequency band, said third pulse carrier having a pulse-repetition frequency lower than said second center frequency and a third frequency band spaced from said second frequency band, adding at least one of said second FM carrier and said third pulse carrier to said first FM carrier to form a frequency-division multiplex signal; and symmetrically clipping said frequency-division multiplex signal to form a limited waveform;

irradiating a laser beam turning on and off in response to said limited waveform onto said optical absorbing layer of said optical information recording medium rotating at a linear velocity of 10.1–11.4 m/sec. along said pre-groove to form a plurality of pits each having a changed reflectivity being duty-cycle modulated in response to said limited waveform.

4. An optical information recording medium according claim 3, wherein said pre-groove has a width of 0.35–0.55 micrometer.

* * * * *